United States Patent [19]
Tomiyori

[11] Patent Number: 6,119,023
[45] Date of Patent: Sep. 12, 2000

[54] DIGITAL PORTABLE TELEPHONE SET HAVING BACKLIGHTED DISPLAY WITH REDUCED POWER CONSUMPTION

[75] Inventor: Yutaka Tomiyori, Tokyo, Japan

[73] Assignee: NEC Corporation, Tokyo, Japan

[21] Appl. No.: 08/820,420

[22] Filed: Mar. 18, 1997

[30] Foreign Application Priority Data

Mar. 19, 1996 [JP] Japan ................................. 8-063482

[51] Int. Cl.[7] .............................. H04B 1/38; H04B 7/00; H04B 1/16; H04M 1/00
[52] U.S. Cl. ......................... 455/574; 455/343; 455/383; 455/572
[58] Field of Search ................................... 455/506, 127, 455/343, 574, 38.3; 370/317; 327/544

[56] References Cited

U.S. PATENT DOCUMENTS

| | | | |
|---|---|---|---|
| 4,675,863 | 6/1987 | Paneth et al. | 370/50 |
| 5,010,566 | 4/1991 | Seo | 455/566 |
| 5,487,181 | 1/1996 | Dailey et al. | 455/89 |

FOREIGN PATENT DOCUMENTS 8-138153  5/1996  Japan .

Primary Examiner—Dwayne D. Bost
Assistant Examiner—Raymond B. Persino
Attorney, Agent, or Firm—Sughrue, Mion, Zinn, Macpeak & Seas, PLLC

[57] ABSTRACT

In a cellular phone set with a backlighted display, a power amplifier is ON/OFF-controlled in a time division fashion for communicating. A backlight source is driven by a backlight driving circuit synchronized with the ON/OFF control of the power amplifier so that the backlight source is turned on and off when the power amplifier is in the OFF condition and the ON condition, respectively. A power supply for the backlight source is switched by a switching signal which is produced by an AND of a light-on signal for the backlight source and an inverted signal of the ON/OFF control signal for the power amplifier.

9 Claims, 2 Drawing Sheets

DIGITAL PORTABLE TELEPHONE SET HAVING BACKLIGHTED DISPLAY WITH REDUCED POWER CONSUMPTION

BACKGROUND OF THE INVENTION

This invention relates to a wireless communication set with a backlighted display and, in particular, to a driver circuit for a backlight source in such a wireless communication set.

A wireless communication set such as a wireless telephone set is known in the art and has a transmitter including a power amplifier. In a certain communication network, for example, a digital communication network such as a TDMA (Time Division Multiple Access) network system, the power amplifier is repeatedly turned on and off in a time division fashion to send out an information signal as a burst signal in a time slot allotted thereto. That is, the power amplifier is cyclically and alternatingly brought into an ON condition and an OFF condition. Thus, repetition of increase and decrease is caused in an electric current used in the power amplifier. This results in undesired variation of a power supply voltage for various other circuit portions in the wireless telephone set.

This problem is severe in the wireless telephone set of a battery-powered portable type having an electric cell or battery.

For example, in a cellular phone for use in the Cellular Communications System, an output power for transmission is usually in a range of several tens of milliwatts to several watts, and an electric current of several tens of milliamperes to several hundred milliamperes is consumed thereby in the power amplifier. This results in a voltage drop due to the presence of internal resistance in the electric cell and/or impedance in a printed circuit board used therein. The voltage drop is varied according to the ON/OFF control of the power amplifier to thereby cause variation of the power supply voltage.

In addition, the wireless communication set of a type described above often has a backlighted display for displaying information such as a telephone number, a time, etc., where the display screen is lighted behind by a backlight source.

For the display, there is known a liquid crystal display (LCD), and the display is backlighted by a light emission diode or by an electo-luminescent (EL) device as the backlight source.

The wireless communication set having the backlighted display has a problem that a relatively large electric current is consumed for backlighting the display. Thus, the power supply voltage is lowered by the backlighting in addition to the power supply voltage variation due to ON/OFF operation of the power amplifier. This accelerates the reduction of the life time of the electric cell.

SUMMARY OF THE INVENTION

Therefore, it is a general object of this invention to provide a wireless communication set having a backlighted display with a reduced power consumption.

It is a specific object of this invention to provide a battery-powered digital telephone set of a portable type having a backlighted display with reduced power consumption of a battery.

This invention is applicable to a wireless communication set that has a backlighted display and a power, which is ON/OFF-controlled by an ON/OFF control signal in a time division fashion for communicating, for example, as a digital portable telephone set for use in a TDMA telephone network system.

According to this invention, the wireless communication set comprises: a backlighted display with a backlight source; and backlight driving means for driving the backlight source synchronously with the ON/OFF control signal so that the backlight source is turned on and off during the period when the power amplifier is in the OFF condition and in the ON condition, respectively.

According to an aspect of this invention, the wireless communication set comprises power amplifier control means for producing an ON/OFF control signal to control the ON/OFF condition of the power amplifier, wherein the backlight driving means comprises: light control signal generating means receiving the ON/OFF control signal for producing a light control signal; and switching means receiving the light control signal for switching on and off an electric power supply to the backlight source.

In the wireless communication set, the ON/OFF control signal has sequential and alternating first and second signal levels, where each of the first signal levels and each of the second signal levels correspond to the ON and OFF conditions of the power amplifier. The light control signal has sequential and altering switch-off signal levels and switch-on signal levels corresponding to the first and the second signal levels, respectively. The switching means switches on and off the power supply to the backlight source in response to the switch-on and switch-off signal levels, respectively.

According to another aspect, the wireless communication set may further in response light-on signal generating means for generating a light-on signal. The light control signal generating circuit produces the light control signal during a time when the light-on signal is maintained.

According to an embodiment, the light source control signal generating circuit comprises an inverter that responds to the ON/OFF control signal to produce an inverted signal, and an AND gate circuit having two input terminals for receiving the light-on signal and the inverted signal, and an output terminal for producing the light control signal.

DESCRIPTION OF PREFERRED EMBODIMENT

This invention will be described in connection with an embodiment applied to a digital portable telephone set for use in a TDMA telephone network system, that is, a cellular phone set used in the Cellular Communications System.

Figure 1:
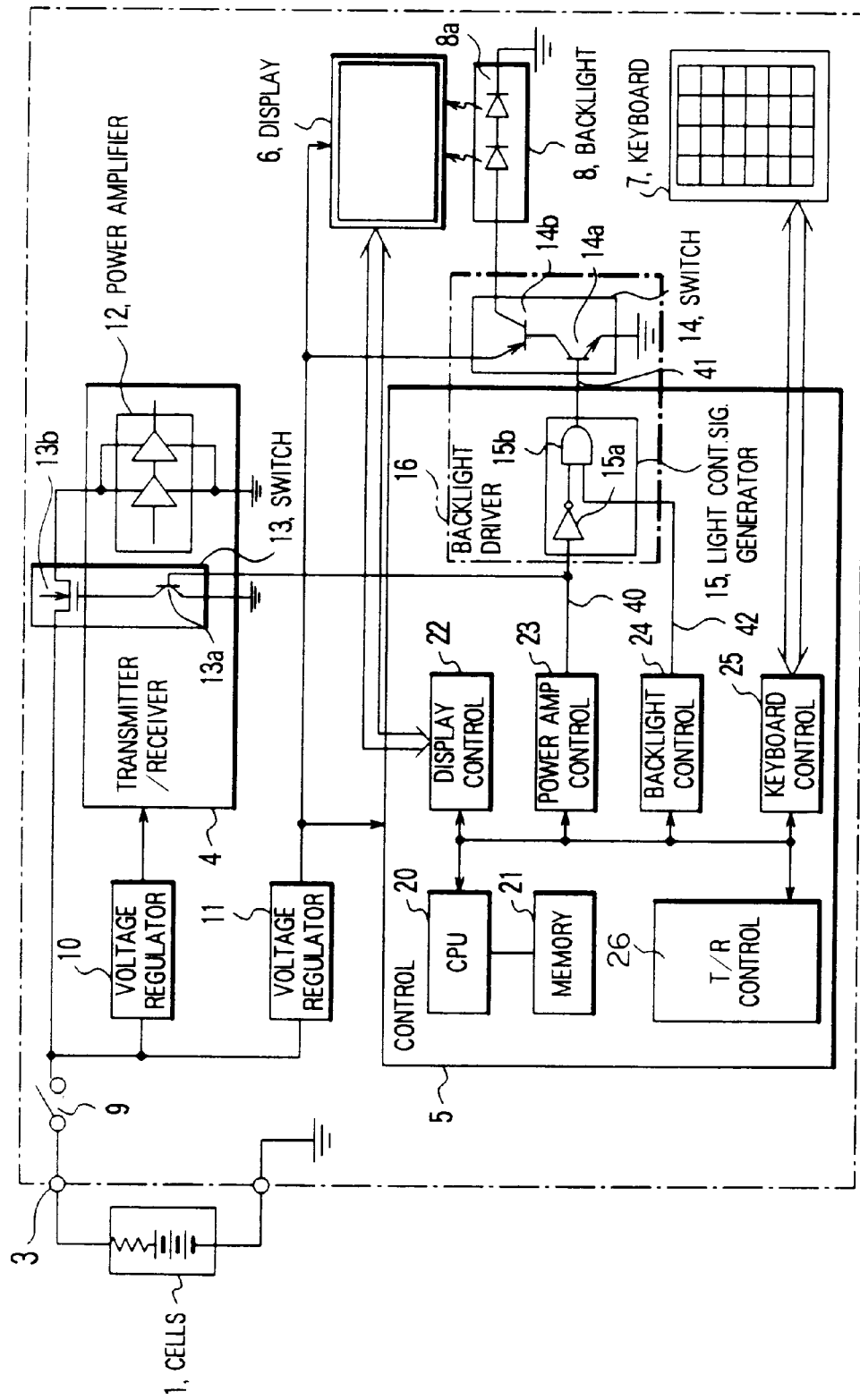
FIG. 1 shows a circuit block diagram of a battery-powered portable digital telephone set for use in the TDMA telephone network system according to one embodiment of this invention.

Referring to FIG. 1, the cellular phone set shown therein comprises a pack of electric cells or batteries 1, and a telephone circuit 2 powered by the cells 1 through power supply terminals 3. The telephone circuit 2 includes transmitter/receiver portion 4, control portion 5, display portion 6, and keyboard portion 7. The display portion 6 is provided with backlight device 8 having light emitting elements 8a such as light emission diodes.

The transmitter/receiver portion 4 is supplied with electric power from the cells 1 through a power switch 9 and a voltage regulator 10, and the control portion 5 and the display portion 6 are supplied with electric power from the cells 1 through the power switch 9 and another voltage regulator 11.

The transmitter/receiver portion 4 includes a power amplifier 12 cyclically supplied with electric power through a switching circuit 13 comprising switching transistors 13a and 13b. The switching circuit 13 is controlled by an ON/OFF control signal 40 to alternately bring the power amplifier 12 into an ON or power-on and an OFF condition or power-off condition in order to send out an information signal as burst signals into time slots allotted to the telephone set in the TDMA telephone network system.

In addition, the backlight device 8 is supplied with electric power from the voltage regulator 11 through a switching circuit 14 comprising switching transistors 14a and 14b. The switching circuit 14 is controlled by a light control signal 41 from a light control signal generator 15 and is switched on and off so that the light emission diodes 8a are turned on and off in synchronization with the OFF and ON conditions of the power amplifier 12, respectively. The light control signal 41 is generated from the ON/OFF control signal 40 and from a light-on signal 42 from a light control signal generator 15, which comprises an inverter 15a for inverting the ON/OFF control signal to produce an inverted signal and an AND gate 15b for receiving the inverted signal and the light-on signal 42 to produce the light control signal 41.

Thus, the display 6 is backlighted by the backlight device 8 during continuation of the light-on signal 42. Therefore, the switching circuit 14 and the light control signal generator 15 serve as a driving circuit 16 for the backlight device 8.

The control portion 5 includes a central processor unit (CPU) 20, a memory 21, a display control circuit 22, a power amplifier controller 23, a backlight controller 24, a key controller 25, and a transmitter/receiver controller (T/R controller) 26. The power amplifier controller 23 generates the ON/OFF control signal 40 under control by the CPU 20 and the T/R controller 26 so as to send out the burst signals to the allotted time slots.

The backlight controller 24 generates the light-on signal 42 under control by the CPU 20 so as to turn on the backlight device 8 for a time duration in response to a key operation in the keyboard 7 and/or in response reception of a calling signal by the transmitter/receiver portion 4.

In operation, when the power switch 9 is turned on, the transmitter/receiver portion 4 and the control portion 5 are energized through the voltage regulators 10 and 11, respectively, and the transmitter/receiver portion 4 is controlled by the T/R controller 26 to perform transmission/reception of information signals for a communication. In detail, the power amplifier controller 23 generates the ON/OFF control signal 40 under control by the T/R controller 26. Then, the power amplifier 12 is alternatingly powered on and off by the ON/OFF control signal 40. Then, a transmission signal is power-amplified by the power amplifier 12 and sent out in a time division fashion, as burst signals, into the allotted time slots.

Figure 2:
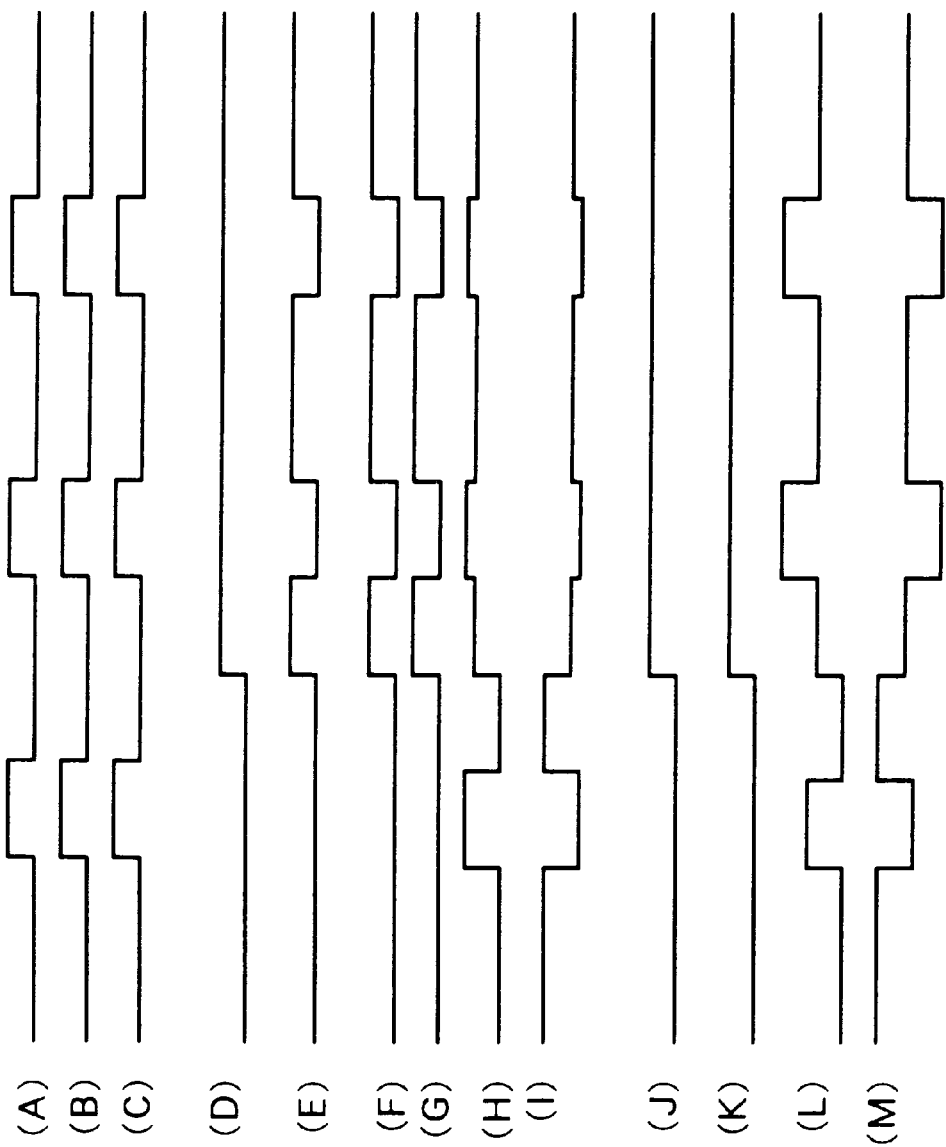
FIG. 2 shows voltage and current sequential time-based variations at various points in the circuit block diagram in FIG. 1.

Referring to FIG. 2, the ON/OFF control signal 40 is shown at (A). Synchronized with the ON/OFF control signal 40, the transmission signal is sent out as the burst signals at time intervals as shown at (B) in FIG. 2. Therefore, a current flows as a transmitting current from the cells 1 to the transmitter/receiver portion 4 during the same intervals, as shown at (C) in the figure.

Referring to FIG. 1 in addition to FIG. 2, the backlight controller 24 generates the light-on signal 42 under control by CPU 20 as shown at (D) in FIG. 2 so as to turn on the backlight device 8. The light-on signal 42 is applied to one input of the AND gate 15b to open the AND gate. The ON/OFF control signal 40 from the power amplifier controller 23 is inverted at the inverter 15a to produce an inverted signal. The inverted signal is applied to the other input of the AND gate 15b. The inverted signal this passes through the AND gate 15b to produce the light control signal 41 as shown at (E) in FIG. 2.

Comparing the (A), (D) and (E) in FIG. 2, the ON/OFF control signal 40 comprises sequential alternating first and second signal levels corresponding to the ON and OFF conditions, respectively, and the light control signal 41 comprises switched-off and switched-on signal levels which correspond to the first and second signal levels of the ON/OFF control signal 40, respectively, and are alternatingly repeated during continuation of the light-on signal 42.

The switching transistor 14a as in the switching circuit 14 is applied with the light control signal 41 and is switched off and on by the stitching off and on signal levels of the light control signal 41. Accordingly, the switching transistor 14b is also switched off and on in response to the switching operation of the switching transistor 14a and cyclically energizes or drives the light emission diodes 8a, as shown at (F) in FIG. 2. Thus, the light emission diodes 8a illuminate the display behind.

Data read out from the memory 21 and/or inputted from the keyboard 7 are displayed on the display 6 under control of the display controller 22. The displayed images of the data are backlighted and can be clearly viewed.

The turning on/off operation of the backlight device 8 is repeated at the same rate as the sending out of the burst signals, for example, at 50 Hz in the PDC (Personal Digital Cellular), which is based on the RCR (Research & Development Center for Radio System) Standard 27. Therefore, the images on the backlighted display can be viewed without any flicker.

In turning on/off operation of the backlight device 8, a current also flows, as a backlight current as shown at (G) in FIG. 2, from the cells 1 to the light emission diodes 8a through the voltage regulator 11 and switching transistor 14b. However, as will be clearly understood from FIG. 2, the backlight current (G) does not overlap with the transmission current (C). Therefore, the maximum of the total current of the backlight current (G) and the transmission current (C) is the larger one of them as shown at (H) and is not increased by use of the backlighted display. Accordingly, although the power amplifier and the backlight device are employed in combination thereof, the terminal voltage of the cells 1 is equal to that in operation of the power amplifier or operation of the backlight device alone, and is not lowered by the combination use, as shown at (I) in FIG. 2.

Therefore, according to the present invention, voltage variation of the power supply for circuit portions other than the power amplifier and the backlight device is suppressed, and power consumption is also reduced so that the life time of the cells is prolonged.

For comparison with this invention, it is provided that the light control signal generator 15 is not used but that the switching circuit 14 is directly controlled by the light-on signal 42.

In such a case, the backlight device 8 is energized and driven as shown at (J) in FIG. 2 over the time duration during which the light-on signal 41 is maintained as shown at (D) in FIG. 2. Therefore, the backlight current also continues to flow as shown at (K) in FIG. 2 over the time duration during which the light-on signal 41 is maintained. As a result, the maximum of the total current of the backlight current (K) and the transmission current (C) is a sum of them as shown at (L) and varies considerably in level. Therefore, the terminal voltage of the cells is also significantly varied in level as shown at (M) in FIG. 2. This results in an erroneous operation of the telephone set and reduction of the life time of the cells.

What is claimed is:

1. A wireless communication set having a power amplifier that is repeatedly turned on and off by an ON/OFF control signal for communicating in a time division fashion by transmitting information in a time slot allotted to said wireless communication set when said power amplifier is on, comprising:

a backlighted display with a backlight source;

backlight driving means for driving said backlight source synchronously with said ON/OFF control signal, wherein said backlight source is turned on when said power amplifier is off, and wherein said backlight source is turned off when said power amplifier is on.

2. A wireless communication set as claimed in claim 1, wherein said wireless communication set is battery-powered.

3. A wireless communication set as claimed in claim 2, wherein said wireless communication set is portable.

4. A wireless communication set as claimed in claim 3, wherein said wireless communication set is a digital telephone set for use in a TDMA telephone network system.

5. A wireless communication set as claimed in claim 4, further comprising power amplifier control means for producing said ON/OFF control signal to control the ON/OFF condition of said power amplifier, wherein said backlight driving means comprises:

light control signal generating means receiving said ON/OFF control signal for producing a light control signal; and switching means receiving said light control signal for switching on and off an electric power supply supplying electricity to said backlight source.

6. A wireless communication set as claimed in claim 5, wherein:

said ON/OFF control signal has sequential and alternating first and second signal levels, and wherein each of said first signal levels and each of said second signal levels correspond to said ON and OFF conditions of said power amplifier;

said light control signal has sequential and alternating switch-off signal levels and switch-on signal levels corresponding to said first and said second signal levels, respectively; and said switching means switches on and off the power supply to said backlight source in response to said switch-on and switch-off signal levels, respectively.

7. A wireless communication set as claimed in claim 5, further comprising light-on signal generating means for generating a light-on signal, wherein said light control signal generating means produces said light control signal during a time when said light-on signal is maintained.

8. A wireless communication set as claimed in claimed in claim 7, wherein said light control signal generating means comprises:

an inverter that inputs said ON/OFF control signal to produce an inverted signal; and an AND gate circuit having two input terminals for receiving said light-on signal and said inverted signal, and having an output terminal for producing said light control signal.

9. A wireless communication set as claimed in claim 1, wherein said backlighted display is a liquid crystal display and wherein said backlight source is a light emitting diode.

* * * * *